United States Patent [19]
Simon

[11] Patent Number: 5,213,250
[45] Date of Patent: May 25, 1993

[54] METHOD FOR FORMING A LIGHTWEIGHT FLANGED AXLE SHAFT

[76] Inventor: Joseph A. Simon, 237 Lothrup, Grosse Pointe Farms, Mich. 48236

[21] Appl. No.: 960,015

[22] Filed: Oct. 13, 1992

Related U.S. Application Data

[63] Continuation-in-part of Ser. No. 811,452, Dec. 19, 1991.

[51] Int. Cl.$^5$ .............................................. B23K 20/12
[52] U.S. Cl. ................... 228/114; 228/173.4
[58] Field of Search ............... 228/112, 113, 114, 125, 228/173.4, 176

[56] References Cited

U.S. PATENT DOCUMENTS

| | | | |
|---|---|---|---|
| 4,242,888 | 1/1981 | Komeiji et al. | 228/112 |
| 4,487,357 | 12/1984 | Simon | 228/114 |
| 5,027,996 | 7/1991 | Fefeu et al. | 228/114 |
| 5,088,638 | 2/1992 | Karaev et al. | 228/114 |

*Primary Examiner*—Samuel M. Heinrich
*Attorney, Agent, or Firm*—Harness, Dickey & Pierce

[57] ABSTRACT

A method for forming a lightweight flanged axle shaft particularly for use within automotive vehicles for transmitting power from a power source, such as the differential, to a driven wheel. The method includes extruding a tubular blank through a die throat by pushing the blank through the die throat and causing the blank to collapse inwardly around a mandrel-like member located within the die throat to thereby form an elongated, thin wall, hollow tube. A flange member, which is separately stamped out of metal, is formed with a disk-like flange and an integral central tubular-shaped hub whose free edge is of approximately the same diametrical size and thickness as the end of the shaft. The flange hub and the shaft end are welded together, face to face, by engaging the two and rapidly spinning one relative to the other to generate sufficient heat to fuse them together upon discontinuance of the rotation. This produces a one-piece, long, hollow, thin wall, lightweight, hollow shaft with a hollow flange having a hollow flange hub integrated with the shaft end. The opposite end of the shaft is configured, such as with spline teeth, for fastening that shaft end to a drive or driven member while the flange at the opposite end of the shaft is fastened to the opposite drive or driven member.

8 Claims, 4 Drawing Sheets

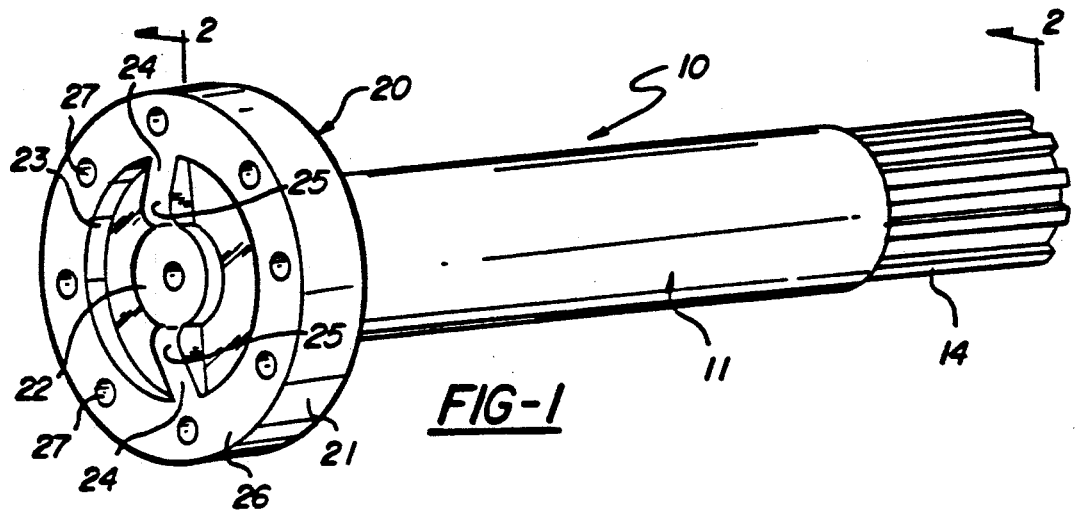
FIG-1
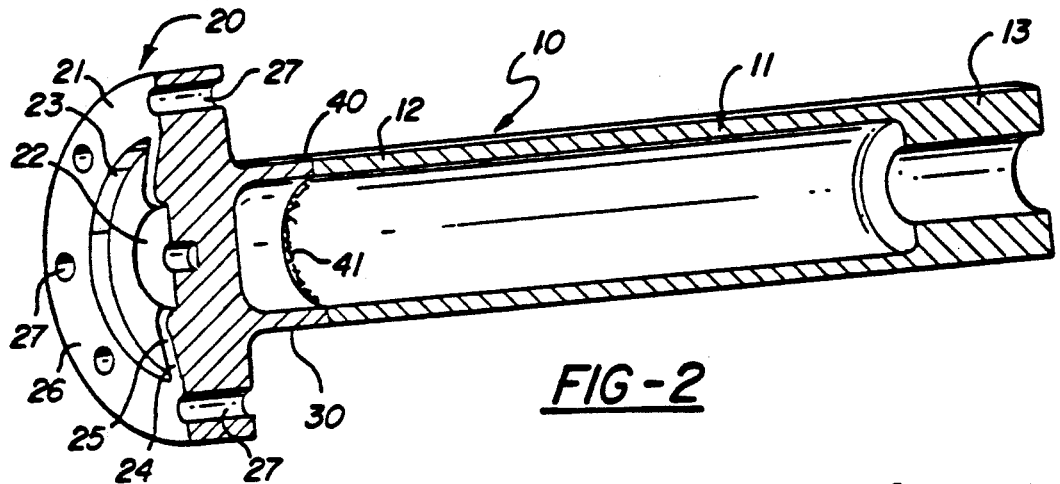
FIG-2
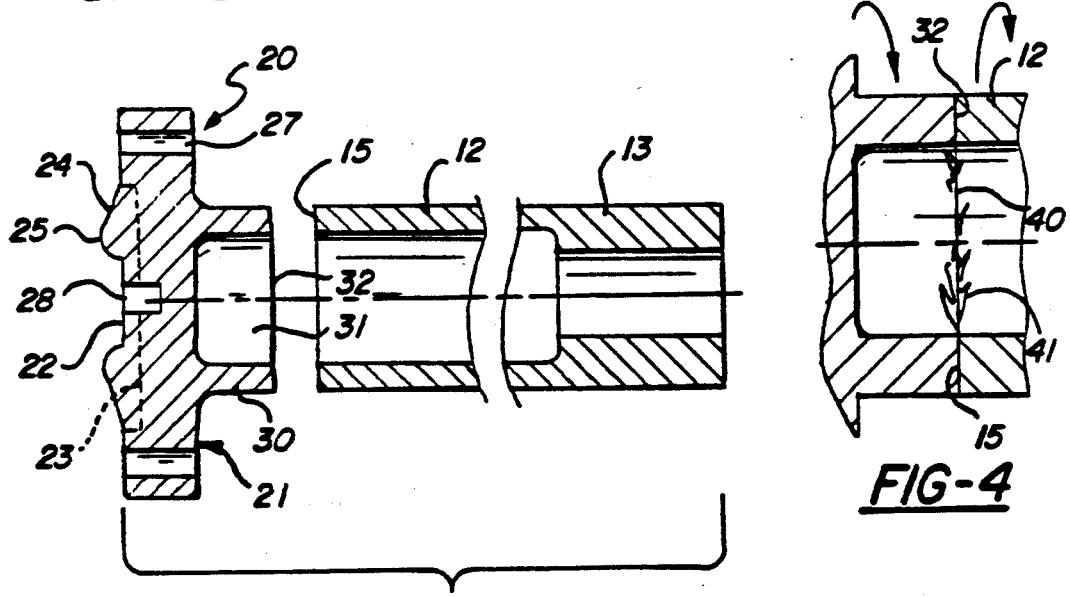
FIG-3
FIG-4

METHOD FOR FORMING A LIGHTWEIGHT FLANGED AXLE SHAFT

This is a continuation-in-part of U.S. application Ser. No. 07/811,452 filed Dec. 19, 1991.

BACKGROUND OF THE INVENTION

This invention relates to an elongated, hollow, thin wall, rigid drive shaft having a flange formed on one end and a coupling configuration, such as spline teeth, formed on its opposite end. The shaft is useful for coupling together a driving and a driven member, such as the differential of an automotive vehicle and a driven wheel.

Drive shafts, particularly for automotive vehicles, are typically formed of solid metal shafts with their opposite ends formed for connecting to the drive and driven members of the vehicle. For example, a flange may be machined on one end of the shaft and the opposite end of the shaft may be provided with external or internal spline-like teeth so that the shaft may be connected to the differential and to a wheel of the vehicle. Because such drive shafts must transmit considerable torque and are subjected to rapid starts and stops of power transmission, they must be rigid and strong enough to perform under both normal and high overload conditions. Thus, drive shafts are made relatively heavy in order to provide the needed rigidity and strength.

It would be desirable to provide, particularly for automotive vehicle use, a lightweight drive shaft, which nevertheless provides the same rigidity and torque carrying capacity as a solid heavy shaft. This is in accordance with the desire to reduce the weight of automotive vehicles as much as possible so as to reduce vehicle fuel consumption and unslung weight.

One method of reducing a hollow, lightweight shaft is described, in general, in my prior patents which relate to the extrusion of ring-like metal blanks through tubular die throats. The blanks are pushed through the die throats by a suitable punch having an extension which forms a mandrel-like member within the tubular die and blank. In general, this method may be used to produce hollow, thin wall, rigid tubes. By utilizing one or more mandrel-like extensions of varying diameters and different punches, a tube may be formed with uniform wall thicknesses, but with thickened wall sections at selected portions thereof. Examples of this system for forming hollow tubes are illustrated in my U.S. Pat. Nos. 4,002,286 issued Jan. 11, 1977; 4,277,969 issued Jul. 14, 1981; 4,292,831 issued Oct. 6, 1981; 4,435,972 issued Mar. 13, 1984 and 4,991,421 issued Feb. 12, 1991. These patents illustrate methods for forming hollow tubes for various purposes with pre-selected wall thicknesses.

Thus, the invention herein relates to a method for forming a hollow, extruded metal axle shaft upon whose end a pre-formed metal flange is fastened for inexpensively fabricating a lightweight shaft with adequate strength and rigidity for its required purpose.

SUMMARY OF THE INVENTION

This invention contemplates a method for forming a lightweight flanged end shaft by, first, extruding a tubular metal blank through a tubular die having a restricted die throat to form an elongated, thin wall, hollow, rigid shaft. The extrusion is accomplished by inserting a short, tubular metal blank within the die and then pushing the blank through the die throat by means of a punch. The punch has a mandrel-like extension arranged within the blank and the die throat so that the blank may collapse about the extension for forming the required interior diameter of the tube while the exterior of the tube is formed by the die throat. By utilizing appropriate punches, selected portions of the tube may be inwardly thickened. For example, the lead end and the trailing end of the extruded tube may be of greater wall thickness than the tube portion located between them. This provides material at one end for the formation of spline-like teeth or the like. The opposite end of the extruded tube terminates in a blunt, annular surface.

A flange member is separately hot forged, stamped or cold formed. The flange member is in the shape of a generally disk-like flange with a central, integral hub. The hub is generally tubular or cup-like in shape. That is, the hub is short and hollow with a free, annular, blunt edge which duplicates in size and thickness, the free, blunt end surface of the shaft. The hub may be closed, like a cup, by the portion of the flange which the hub overlaps. Or, the flange may have a central opening in alignment with the inner diameter of the shaft end.

The flange hub edge is pressed, in face-to-face contact, against the blunt free end of the shaft and the flange hub and shaft rapidly rotated relative to each other to generate sufficient heat to melt the adjacent surfaces. Thus, when the rotation is stopped, the hub edge and shaft surface fuse together to form a weld. Meanwhile, molten metal, from the melted surfaces, which typically forms a rams horn style flash in this type of spin welding operation, is squirted inwardly and outwardly. The inward flash flows into the interior of the hollow hub and shaft where the flash solidifies and may remain. The outward flash, if desired, is sheared off.

A significant object of this invention is to provide a lightweight drive shaft which, nevertheless, is at least as strong or stronger than a solid shaft and is sufficiently rigid for the transmission of torque from a driving member to a driven member, such as from a vehicle differential to a wheel.

Another object of this invention is to provide a method for forming a flanged, hollow, lightweight, rigid, strong axle shaft which method is generally less expensive than typical methods.

Still another object of this invention is to provide a method for forming a lightweight, hollow, thin wall, drive shaft with a pre-formed flange integrated with one end of the shaft through a friction welding procedure. By this method, the opposite end of the shaft may be formed with a thickened wall section to enable the formation of spline-like teeth thereon for coupling purposes.

These and other objects and advantages of this invention will become apparent upon reading the following description, of which the attached drawings form a part.

DESCRIPTION OF PREFERRED EMBODIMENTS

FIG. 1 is a perspective view of the lightweight, flanged drive shaft.

FIG. 2 is a perspective, cross-sectional view, of the shaft illustrated in FIG. 1.

FIG. 3 is a cross-sectional, fragmentary view showing the alignment of the forged flange hub with the end of the extruded tubular shaft.

FIG. 4 is an enlarged, fragmentary view of the joint formed during the rapid rotation of the flange hub or shaft relative to one other.

DETAILED DESCRIPTION OF THE PREFERRED EMBODIMENTS

Figure 5:
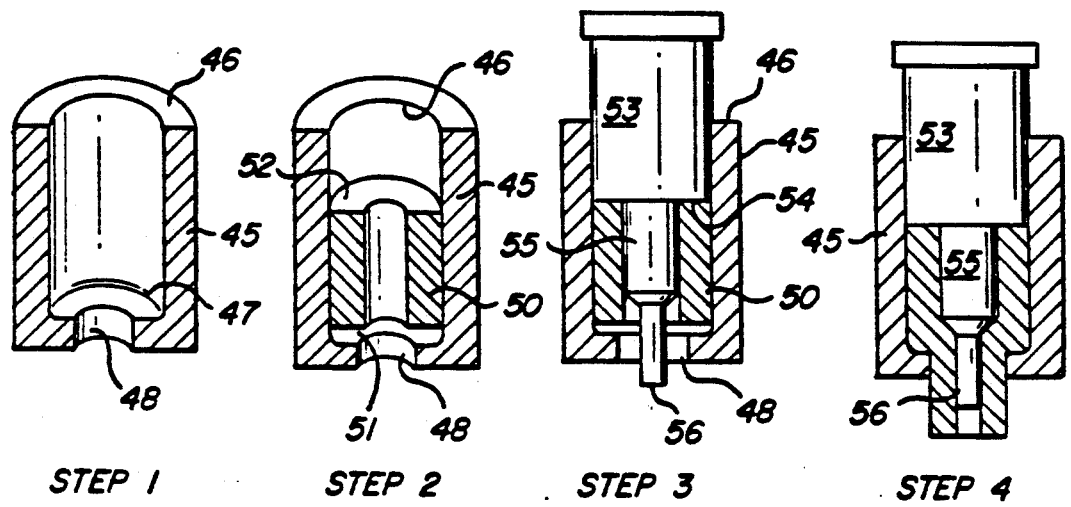
FIG. 5 is a schematic drawing, in cross-section, which illustrates the series of steps in the extrusion of the hollow shaft.
Figure 5:
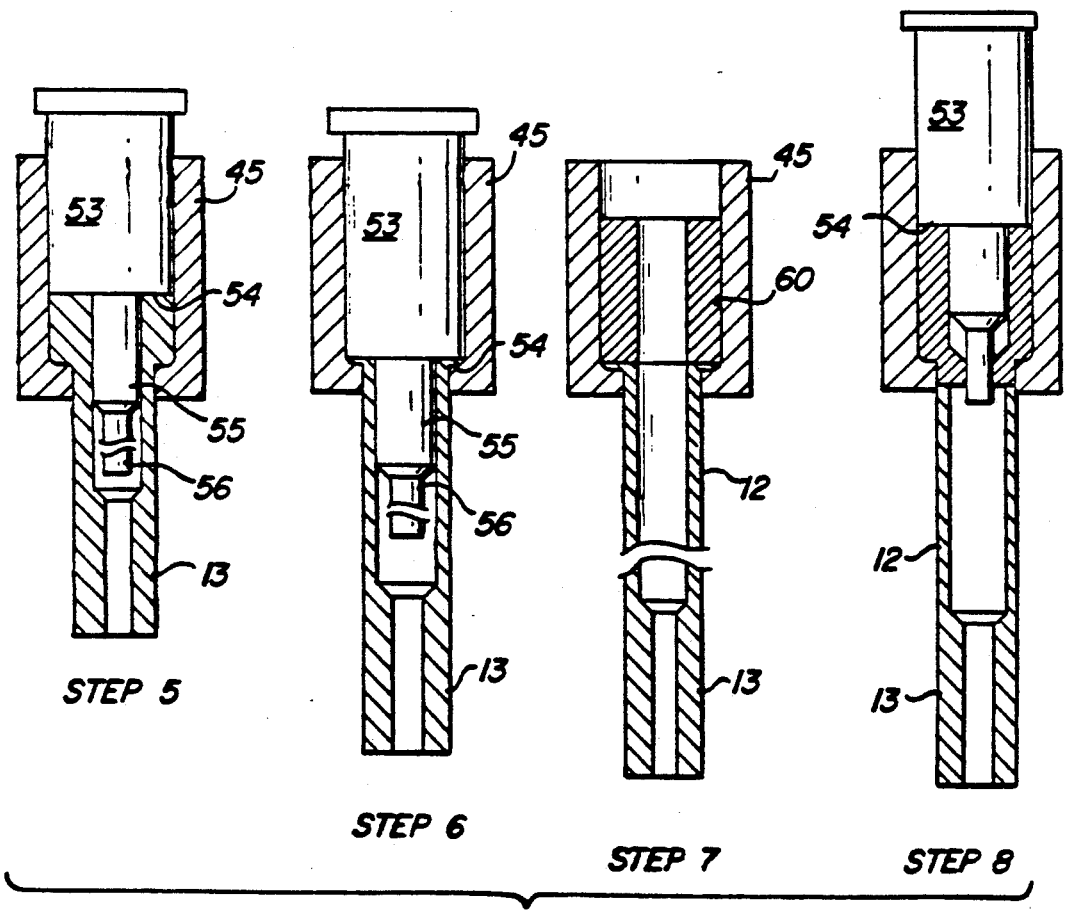

Referring to the drawings, FIGS. 1 and 2 illustrate a lightweight, flanged axle shaft. The shaft is formed of an elongated, hollow shaft portion 11 having a thin wall section 12 and an inwardly thickened wall section 13 at one end. Spline teeth 14 are formed in the thicker wall section end for providing a means for coupling the shaft to a driving member or to a driven member as required. The spline teeth may be rolled or swaged or cut in the thicker wall section. By way of example, the spline teeth may be formed for coupling to a automotive vehicle rear differential which will supply power to a wheel through the shaft.

The thin wall section has a uniformed thickness along its length with a uniform outer diameter and inner diameter and terminates in an end portion which provides a flat, annular end surface 15. The end portion may be thickened inwardly or of the same wall thickness as the thin wall section. The thin wall section may be provided with spaced apart inwardly thickened portions, such as for localized reinforcing purposes or for providing additional metal thickness for machining various desired configurations in the shaft. Preferably, the thin wall section is of uniform thickness as illustrated in FIG. 2 of the drawing.

A forged flange member 20 is secured to the hollow shaft 11 so that the two appear to be one integral article. Preferably, the flange member is formed by hot forging metal between suitable hammer or pressure members using dies to create the desired flange member shape. The flange member illustrated in FIGS. 1–4 includes a disk-like flange 21 whose shape and size may vary, depending upon the coupling requirements. In the drawings, the flange is illustrated as including a center boss 22 which is surrounded by a depressed surface 23. Spoke-like ribs 24 extend oppositely from the boss. These ribs may include projections 25 useful for fitting into or coupling into another member. A rim 26 surrounds the depressed surface 23 and the ribs. Bolt holes 27 are formed in the rim for bolting the flange to a member to which it is to be coupled. In addition, a center hole 28 may be formed in the boss to serve as a guide or locating point.

The flange member includes an integral cup-like shaped hub 30. The hub has a hollow interior 31 which, therefore, forms an annular rim 32. The rim provides a blunt end or annular flat surface.

As schematically illustrated in FIG. 3, the blunt end surface 15 on the hollow shaft 11 and the blunt end surface formed by the annular rim 32 on the hub 30, are aligned axially face to face. The two annular surfaces are of substantially the same size and shape so that there they closely fit together as illustrated schematically in FIG. 4. The two end surfaces are welded together along a weld seam 40. The welding is accomplished by rotating the flange member or the shaft relative to the other at high speed while the surfaces are in contact. The friction between the touching surfaces generates enough heat to melt the respective surfaces. As soon as the rotation is stopped, the two surfaces are butted and fuse together, as illustrated in FIG. 4. The rotation of the member may be accomplished either by rotating either one of the members while holding the other motionless or by rotating both members in opposite directions.

In this welding step, the speed of rotation, the amount of time of rotation required and the pressure between the adjacent surfaces may be varied, depending upon the metals used, surface roughnesses, etc. Thus, it may be necessary to determine those factors by trial and error as, for example, utilizing a lathe which holds one of the members stationary and rotates the other member. This permits trying varying speeds and pressures, etc. to determine the optimum conditions.

The foregoing method of welding is known and is used for other purposes. One of the problems that arise in that type of welding is that some small part of the molten metal that is formed during the rotational step tends to squeeze out between the adjacent parts to form a thin rams horn shaped flash. The flash solidifies and forms jagged or rough, thin metal pieces. The flash is directed inwardly and outwardly, as illustrated in FIG. 4. In the inward case, the thin molten metal pieces can flow into the hollow space in the hub and shaft where, when solidified, they do no harm. In the outward case (illustrated in phantom), the flash may be left on the shaft, sheared off or otherwise removed from the outer surface. However, to the extent that flash forms on the outer surface, a suitable cleaning or removal step may be used to smooth the joint portions adjacent the seam 40.

FIG. 5 shows, schematically, a series of steps involved in the formation of the hollow shaft 11. Step 1 illustrates, schematically and in perspective, an open-end die 45 having an upper, inlet end 46. The lower, opposite end of the die is provided with an annular shoulder 47 which forms and surrounds an extrusion die throat 48.

A tubular blank 50 formed of a suitable metal, such as a mild steel or the like, is dropped into the die as shown in FIG. 2. In this case, the lower end of the blank forms the lead end 51 and the upper end forms a trailing end 52.

Next, a punch 53 is inserted in the die. The punch is sized to closely fit within and fill the die. The punch is provided with a lower, annular pressure surface 54 which bears against the trailing end 52 of the tubular blank 50. Thus, the punch may be advanced toward the die throat 48 for pushing the blank through the die throat. Also, the punch may be provided with a thick, mandrel-like, punch extension 55 which fits within the tubular blank.

Step 4 shows the punch advancing towards the die throat and pushing the blank through the die throat. The inward collapsing of the blank material produces the interior diameter of the thickened end of the shaft.

Next, as shown in FIG. 5, the punch continues advancing towards the die throat until the thick mandrel-like punch extension 55 is located within the die throat. Thereafter, the blank is extruded through the die throat around the punch extension 55 to form the thin wall section of the shaft.

The movement of the punch continues, as shown in Step 6, until the blank is substantially extruded through the die throat. At that point, the punch is removed and a second tubular blank 60 is inserted in the die as illustrated in Step 7. Thereafter, the punch is reinserted, as shown in Step 8, and pushes the second tubular blank towards the die throat which extrudes the second blank while releasing the first blank from the die throat with its second thickened end.

Figure 6:
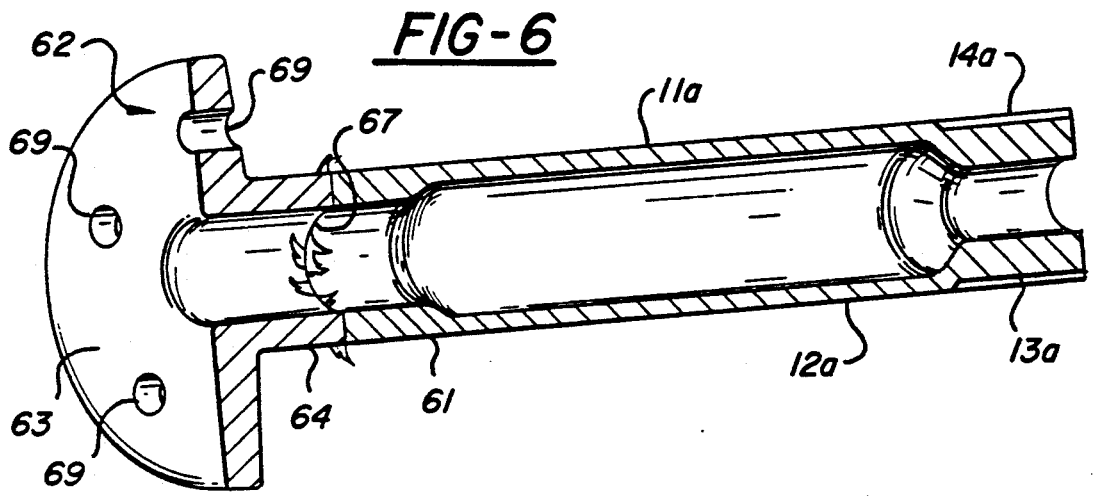
FIG. 6 is a cross-sectional, perspective view of a modified shaft and flange.
Figure 7:
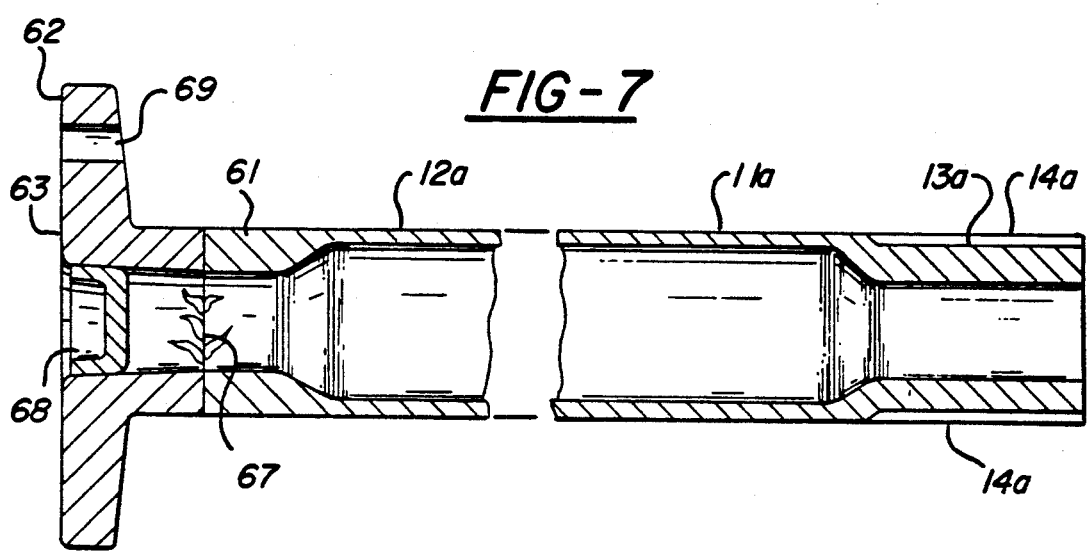
FIG. 7 is an enlarged, fragmentary view of the shaft and flange of FIG. 6.
Figure 8:
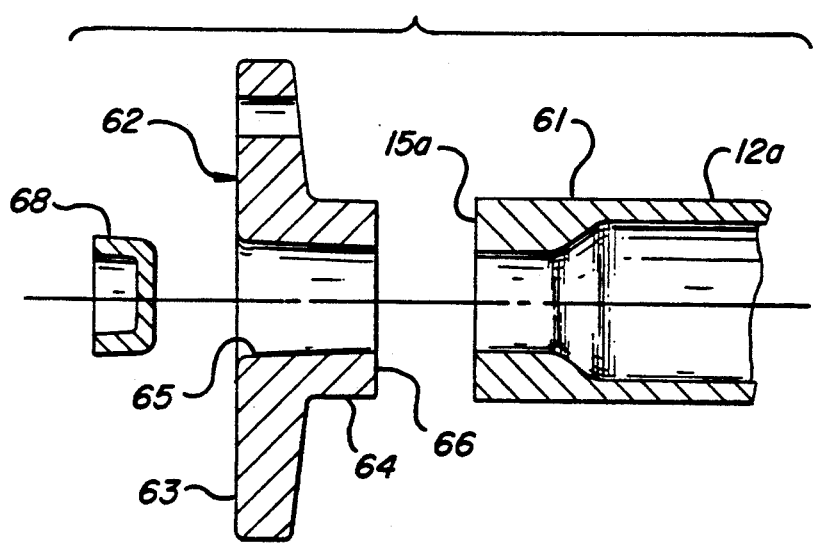
FIG. 8 is a cross-sectional, fragmentary view showing the alignment of the flange member, shaft end and closure cap.

The modification illustrated is FIGS. 6–8 includes a hollow shaft 11a which has an elongated thin wall section 12a and an inwardly thickened wall section 13a at one end. Spline teeth 14a are formed on the thickened wall section 13a at one end. Spline teeth 14a are formed on the thickened wall section 13a.

The opposite end of the shaft is formed with an inwardly thickened wall section 61 which may be of the same thickness as wall section 13a or may be of a different thickness depending upon the strength requirements for the shaft. Wall section 61 terminates in an annular end surface 15a (see FIG. 8).

A stamped flange member 62 is secured to the shaft end surface 15a, the flange member is formed with a disk-like flange 63 with a tubular hub 64. An opening 65 extends through the hub and flange portions so that an annular rim 66 is formed on the hub.

The annular rim 66 is welded to the shaft annular surface 15a in the same manner as described above with respect to the modification of FIGS. 1–4. Similarly, the molten metal flash 67 formed during the welding flows into the hollow interior of the shaft and hub where it remains.

The opening 65 may be closed with a cup-shaped closure 68 which is force-fitted into the opening. Also, openings 69 may be formed in the flange for attaching the flange to another part.

Figure 9:
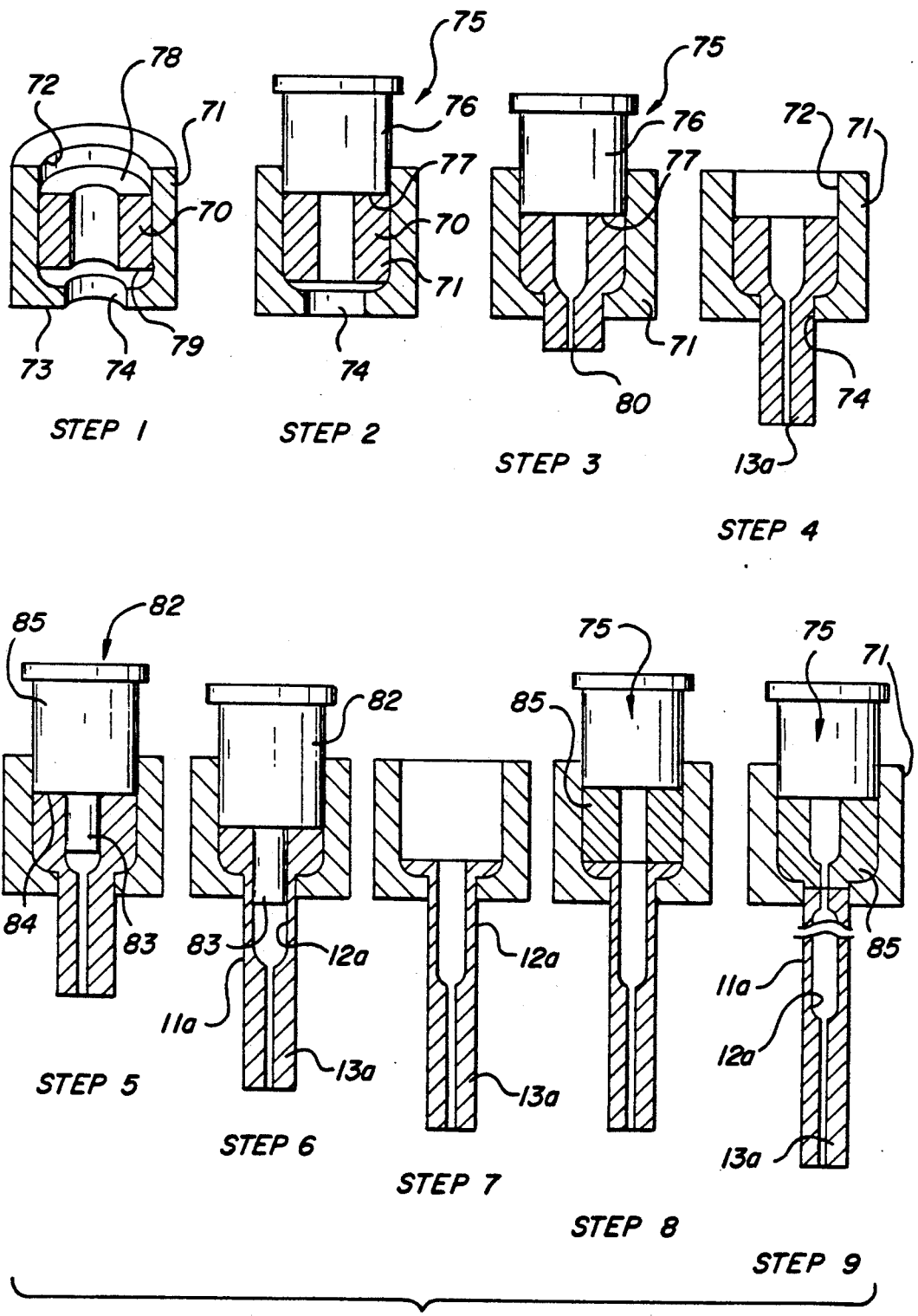
FIG. 9 is a schematic drawing, in cross-section, illustrating the series of steps in the extrusion of the shaft of FIG. 6.

FIG. 9 illustrates, schematically, the various steps in making the extruded shaft. Step 1 shows, in a cross-sectional, perspective view, the tubular blank 70 positioned within a tubular die 71 which has an entry end 72 for receiving the blank. The die is also provided with an exit end formed by an annular, radially inwardly extending shoulder 73 which surrounds a constricted die throat 74.

Next, as shown in Step 2, a punch 75 is inserted into the entry end of the die. The punch is provided with a punch body 76 which substantially fills the die transversely. The punch also has a substantially blunt, lead end 77 which presses against the trailing end 78 of the blank. Next, the punch is moved towards the throat 74, in a longitudinal direction to force the blank through the throat. Conversely, the punch could remain stationary and the die may be moved toward the punch so that the same relative motion is achieved. Thus, in describing the movement of the punch, it should be understood that the movement refers to relative motion with either the punch or the die moving, whichever is preferable for the particular mechanism utilized.

Referring to Step 3, as the punch advances towards the die throat, the leading end 79 of the blank is squeezed or extruded through the die throat. That causes the metal to extrude longitudinally and simultaneously, to collapse radially inwardly. By appropriately selecting the amount of pressure and the sizes of the elements, the inward collapse is not complete. That is, a small space is left along the axis of the extruded part to provide a central, opening 80. The diameter of the opening may vary considerably depending upon the design requirement. This forms the thickened wall end portion 13a.

In Step 4, the punch is removed from the die. Then, another punch 82, see Step 5, is inserted in the die. This punch is provided with a mandrel-like extension 83 and has an annular shoulder 84 surrounding the upper end of the mandrel, at the lower end of the punch body 85.

The mandrel 83 is positioned within the interior of the remaining portion of the blank, then, as illustrated in FIG. 6, the punch is moved so that its mandrel is located within the center of the die throat while the extrusion continues. In that manner, the hollow interior, thin wall section 12a is extruded. When the extrusion is almost complete, the punch is removed. (See Step 7.)

Next, a second tubular blank 85 illustrated in Step 8, is placed within the die and the original punch 75 reinserted. Movement of the punch 75 begins the extrusion of the second blank while completing the extrusion of the first blank. Thus, the trailing end of the first blank collapses inwardly to form the thickened end wall portion 15a.

Steps 3 and 4 can be bypassed by utilizing punch 82 initially, that is, for Step 2. In that case, by properly sizing the extension 83, the shaft can be extruded directly to Step 5 without punch 75.

As can be seen, variations in the number and locations of the punch extensions can vary the number, location and sizes of different wall thickness sections in the extruded shaft. It is preferable in the formation of a lightweight, rigid and strong drive shaft, which will be subjected to high torques that are suddenly applied and then continuously maintained, to provide a substantially uniform wall thickness calculated to give the maximum strength with minimum weight. The wall thickness itself will depend upon the length of the shaft, the amount of torque or power transmitted anticipated, impact or other applied loads, etc. Thus, this can vary substantially from one shaft to another.

This invention may be further developed within the scope of the following claims. Having fully described an operative embodiment of this invention.

I now claim:

1. A method for forming a lightweight flanged axle shaft and the like, such as for use in transmitting power from the differential of a vehicle to a power driven wheel, comprising:

inserting a tubular blank, having a lead end and trailing end, in a tubular die having an inlet end for receiving the blank and an opposite die extrusion throat through which the blank is extruded starting with its lead end to its trailing end;

relatively moving a punch, which is sized to closely fit within the die, axially within the die towards the die throat for engaging and pushing the trailing end of the blank towards the die throat and, thereby, extruding the blank through the die throat;

providing a mandrel-like extension on the lead end of the punch means and positioning said extension within the blank and the die throat while moving the punch for thereby collapsing the blank radially inwardly as it is moved through the die throat for forming an elongated, hollow, relatively thin wall tube out of the blank which is extruded through the die throat.

separately stamping a flange member in a generally disk-like, roughly flat shape with an integral central hub formed on one face thereon and with the hub having roughly the same outer diameter as the outer diameter of an end of said shaft and with the free end of the hub formed with a blunt, flat surface;

positioning the blunt end of the hub against an end of the shaft and aligning the two coaxially;

rapidly rotating the hub or the shaft relative to the other while engaging the adjacent ends of the hub and shaft for generating heat in a sufficient amount to weld the two ends together and then stopping such relative rotation to permit the two ends to fuse together;

whereby an elongated, hollow, relatively lightweight metal shaft is formed with a laterally extending flange formed on one end thereof, for providing a means for fastening that end of the shaft to a drive or driven member;

and forming a coupling means on the opposite end of the shaft for securing said opposite end to the other of the two driving and driven members.

2. A method for forming a lightweight flanged axle shaft as defined in claim 1, and forming a smaller diameter opening in the lead end portion of the shaft by the extrusion and, thereby, providing a greater wall thickness along the lead end portion of the extruded shaft as contrasted with forming a larger diameter opening through the shaft from the lead end portion towards the shaft trailing end portion, to form a smaller wall thickness in the shaft from the lead end portion towards the trailing end portion thereof;

forming said coupling means on the thickened trailing end portion of said shaft.

3. A method for forming a lightweight flanged axle shaft as defined in claim 2 and including said coupling means including forming spline-like teeth extruding along the shaft on the thickened, lead end portion thereof.

4. A method for forming a lightweight flanged axle shaft as defined in claim 2, and including stamping flange and integral tubular shaped hub with the hub having a central opening corresponding in diameter with the shaft trailing end portion inner diameter.

5. A method for forming a lightweight flanged axle shaft as defined in claim 2, and including extruding the trailing end portion with a greater wall thickness than the thin wall section and forming the hub wall at approximately the same thickness as the shaft trailing end portion, so that the adjacent hub and shaft end surfaces substantially completely overlap each other when fused together.

6. A method as defined in claim 5 and including permitting molten, excess metal produced during the hub-shaft rotation step to flow outwardly and inwardly of the hub and the hollow shaft so that flash formed from the molten metal flowing inwardly as a result of heating the adjacent ends of the hub and shaft is solidified within and remains within the hollow shaft and hub.

7. A method as defined in claim 5, and including removing the flash on the outside of the shaft.

8. A method as defined in claim 2, and including permitting the flash formed from the molten metal resulting from the fastening of the two adjacent hub and tube ends to flow outwardly and inwardly and to remain inwardly of the hollow shaft and hub;

whereby the hub forms a short extension of the shaft end which carries the transversely arranged flange.

* * * * *